(12) United States Patent
Moriyoshi

(10) Patent No.: US 8,167,443 B2
(45) Date of Patent: May 1, 2012

(54) OPTICAL OBSERVATION APPARATUS

(75) Inventor: Akino Moriyoshi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 340 days.

(21) Appl. No.: 12/636,000

(22) Filed: Dec. 11, 2009

(65) Prior Publication Data

US 2010/0149645 A1  Jun. 17, 2010

(30) Foreign Application Priority Data

Dec. 11, 2008  (JP) .................................. 2008-315682

(51) Int. Cl.
*G02B 21/00* (2006.01)
*G02B 15/14* (2006.01)

(52) U.S. Cl. ......... 359/600; 359/399; 359/407; 359/699

(58) Field of Classification Search .................. 359/511, 359/600, 399–409, 696–701
See application file for complete search history.

(56) References Cited

U.S. PATENT DOCUMENTS

| | | | |
|---|---|---|---|
| 6,280,040 B1 * | 8/2001 | Koide | 359/600 |
| 6,580,555 B2 * | 6/2003 | Crista | 359/426 |
| 7,125,126 B2 * | 10/2006 | Yamamoto | 359/600 |

FOREIGN PATENT DOCUMENTS

JP  2007-232764 A  9/2007
JP  2007-279133  * 10/2007

* cited by examiner

*Primary Examiner* — Thong Nguyen
(74) *Attorney, Agent, or Firm* — Rossi, Kimms & McDowell LLP

(57) ABSTRACT

The apparatus includes a supporting member disposed at an outer circumference of the ocular optical system and an eyepiece cup. A first member thereof includes a cam follower and a second member thereof includes a cam groove to move the eyepiece cup in an optical axis direction with rotation of the eyepiece cup and an introducing groove through which the cam follower is introduced to the cam groove. One member of the first and second members includes an engaging portion, and another member thereof includes a stopper engaging with the engaging portion to prevent rotation of the eyepiece cup in a direction in which the cam follower is returned from the cam groove toward the introducing groove. The stopper formed integrally with another member is elastically movable so as to be located at and retreated from an engaging position to be engageable with the engaging portion.

3 Claims, 7 Drawing Sheets

OPTICAL OBSERVATION APPARATUS

BACKGROUND OF THE INVENTION

The present invention relates to an optical observation apparatus including an ocular optical system, such as binoculars and a monocular.

The optical observation apparatus including an ocular optical system is provided with an eyepiece cup (or eyecup) used for matching a position of an observer's eye to an eye point of the optical observation apparatus. When the observer's eye is naked, the eyepiece cup is protruded with respect to the ocular optical system to be brought into press contact with an observer's face around the eye. When the observer uses eyeglasses, the eyepiece cup is retracted to be brought into press contact with a lens of the eyeglasses.

For example, as an eyepiece cup for binoculars, a protrudable eyepiece cup which is protrudable and retractable to an arbitrary position with respect to the ocular optical system. In particular, a rotating protrudable eyepiece cup using a cam mechanism is easier to stop at an arbitrary position as compared with a straight protrudable eyepiece cup disclosed in Japanese Patent Laid-Open No. 2007-232764.

However, in Japanese Patent Laid-Open No. 2007-232764, an introducing groove portion which introduces a protrusion formed on a lens barrel into a non-penetrated cam groove portion formed on an inner circumferential surface of the eyepiece cup and opens at one side opening portion of the eyepiece cup is formed on the inner circumferential surface of the eyepiece cup. The introducing groove portion facilitates assembly of the eyepiece cup to the lens barrel, but makes drop-off of the eyepiece cup from the lens barrel easy.

Japanese Patent Laid-Open 2007-232764 discloses a configuration in which, in order to prevent the drop-off of the eyepiece cup, the lens barrel is divided into a first lens barrel and a second lens barrel, and the first lens barrel to which the eyepiece cup is attached is screwed to the second lens barrel. Such a constitution makes the drop-off of the eyepiece cup from the lens barrel hard, but increases the number of parts because of the division of the lens barrel into two and increases a diameter of the eyepiece cup since a space for coupling the two lens barrels is needed.

Thus, conventional rotating protrudable eyepiece cups including one disclosed in Japanese Patent Laid-Open 2007-232764 have a complicated configuration which is hard to be miniaturized.

SUMMARY OF THE INVENTION

The present invention provides an optical observation apparatus provided with a rotating protrudable eyepiece cup having a simpler and smaller configuration than conventional ones and a configuration hard to drop off.

The present invention provides as one aspect thereof an optical observation apparatus including an ocular optical system, a supporting member disposed at an outer circumference of the ocular optical system, and an eyepiece cup disposed at an outer circumference of the supporting member, the eyepiece cup being rotatable around an optical axis of the ocular optical system and movable in a direction of the optical axis with respect to the supporting member. When one of the supporting member and the eyepiece cup is referred to as a first member and another thereof referred to as a second member, the first member includes a cam follower portion, and the second member includes a cam groove portion engaging with the cam follower portion to move the eyepiece cup in the direction of the optical axis with rotation of the eyepiece cup and an introducing groove portion through which the cam follower portion is introduced to the cam groove portion with rotation of the eyepiece cup when the eyepiece cup is assembled to the supporting member. One member of the first and second members includes an engaging portion, and another member thereof includes a stopper engaging with the engaging portion to prevent rotation of the eyepiece cup in a direction in which the cam follower portion is returned from the cam groove portion toward the introducing groove portion. The stopper is formed integrally with another member and elastically movable so as to be retreated from an engaging position engageable with the engaging portion in a state where the cam follower portion is located in the introducing groove portion and be located at the engaging position in a state where the cam follower portion is located at an introducing groove portion side end area of the cam groove portion.

Other aspects of the present invention will become apparent from the following description and the attached drawings.

DESCRIPTION OF THE EMBODIMENTS

Exemplary embodiments of the present invention will be described hereinafter with reference to the accompanying drawings.

[Embodiment 1]

Figure 1:
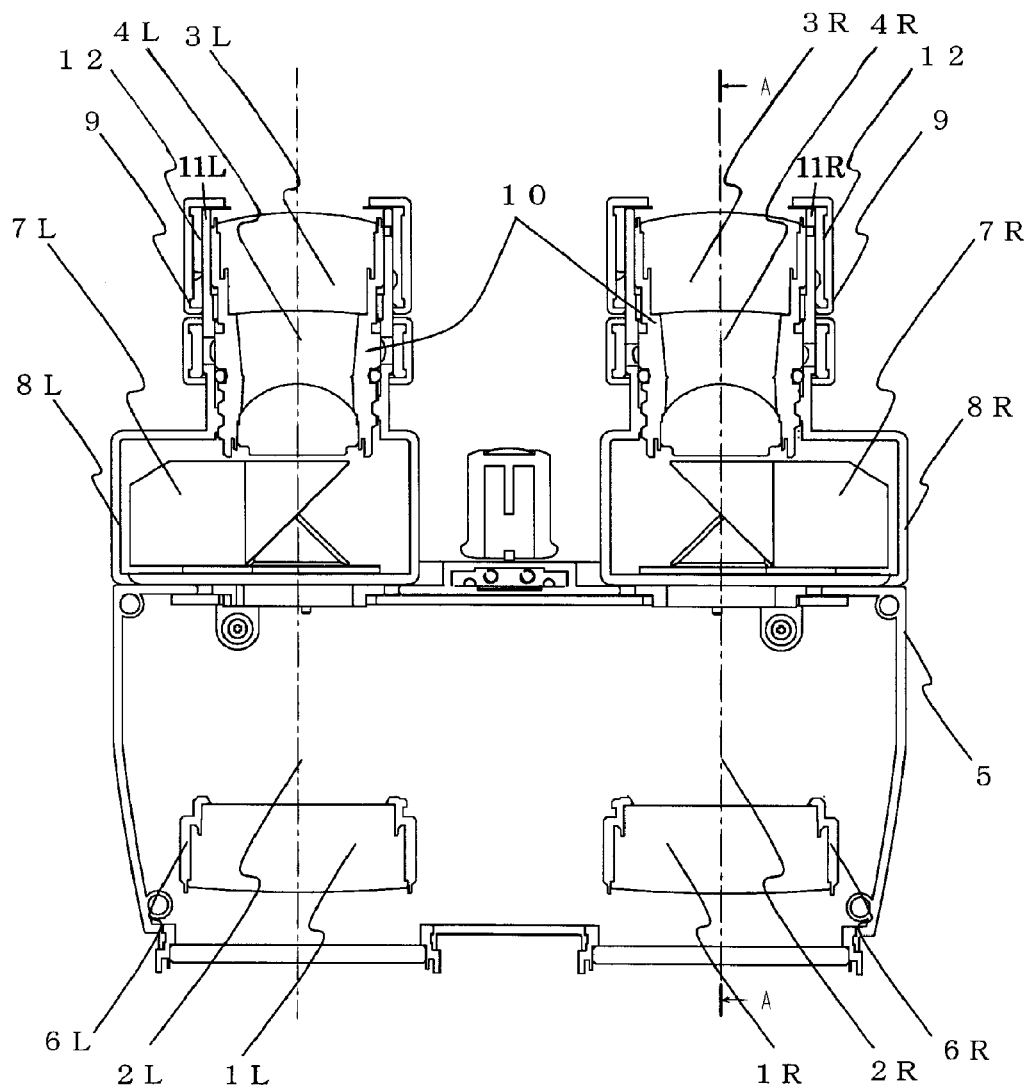
FIG. 1 is an upper cross-sectional view of binoculars of Embodiment 1 of the present invention.

FIG. 1 shows a cross-sectional view of binoculars as an optical observation apparatus of a first embodiment (Embodiment 1) of the present invention when viewed from above.

In FIG. 1, the binoculars include objective units 6L and 6R respectively holding left and right objective optical system 1L and 1R, a main body 5 housing the objective units 6L and 6R, and left and right ocular units 8L and 8R disposed behind (closer to an observer than) the main body 5.

The ocular units 8L and 8R respectively house and hold polo prisms 7L and 7R each forming an erecting optical system, and left and right ocular optical systems 3L and 3R.

The ocular units 8L and 8R are attached to a back of the main body 5 such that light-entrance side parts of optical axes 4L and 4R of the left and right ocular optical systems 3L and 3R respectively coincide with light-exit side parts of optical axes 2L and 2R of the left and right objective optical systems 1L and 1R.

The erecting optical systems may be formed by Daha prisms, parallelogram prisms or mirrors, in place of the polo prisms 7L and 7R.

At observer side parts of the left and right ocular units 8L and 8R, eyepiece cups (eyecups) 12 are attached each of which is rotatable around the optical axis (4L, 4R) of the ocular optical system (3L, 3R) and movable in a direction of the optical axis (hereinafter referred to as "optical axis direction") of the ocular optical system. At an outer circumference of each eyepiece cup 12, an eyepiece rubber 9 formed of an elastic material such as rubber is attached.

Figure 2:
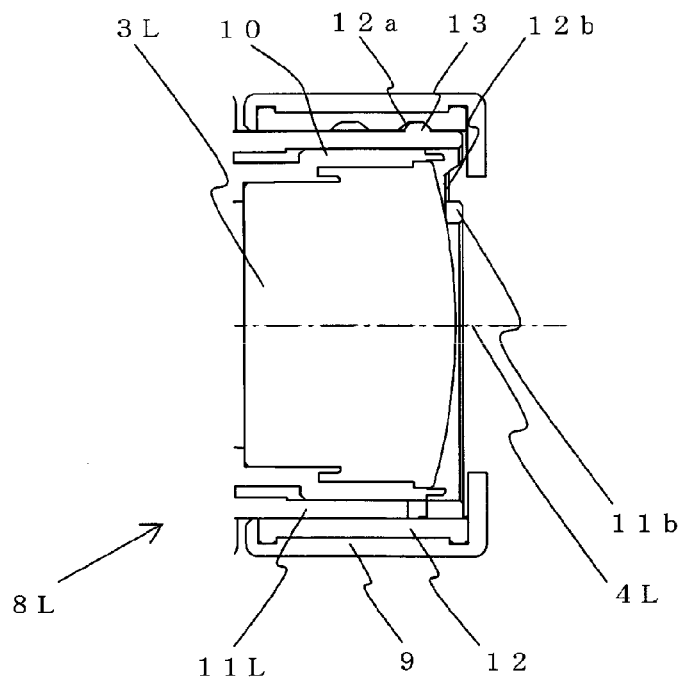
FIG. 2 is a cross-sectional view of the binoculars of Embodiment 1 at a position of an A-A line in FIG. 1.

FIG. 2 shows a part of a cross section of the ocular unit 8L cut at a position of an A-A line shown in FIG. 1. Reference numeral 10 denotes an ocular lens barrel holding the ocular optical system 3L, and reference numeral 11L denotes an ocular fixing frame serving as a supporting member. The ocular fixing frame 11L is disposed at an outer circumference of the ocular lens barrel 10 (in other words, at an outer circumference of the ocular optical system 3L) and holds the ocular lens barrel 10 thereinside.

The eyepiece cup 12 is disposed at an outer circumference of the ocular fixing frame 11L so as to be rotatable around the optical axis of the ocular optical system 3L and movable in the optical axis direction. The eyepiece cup 12 can be rotationally operated by an observer (user of the binoculars).

In this embodiment, the ocular fixing frame 11L corresponds to a "first member", and further corresponds to "one member" of the first member and a second member. The eyepiece cup 12 corresponds to the "second member", and further corresponds to "another member" of the first and second members.

FIG. 2 and FIGS. 3 to 9 described later show a left ocular unit side configuration. This configuration is the same as a right ocular unit side configuration.

Figure 3:
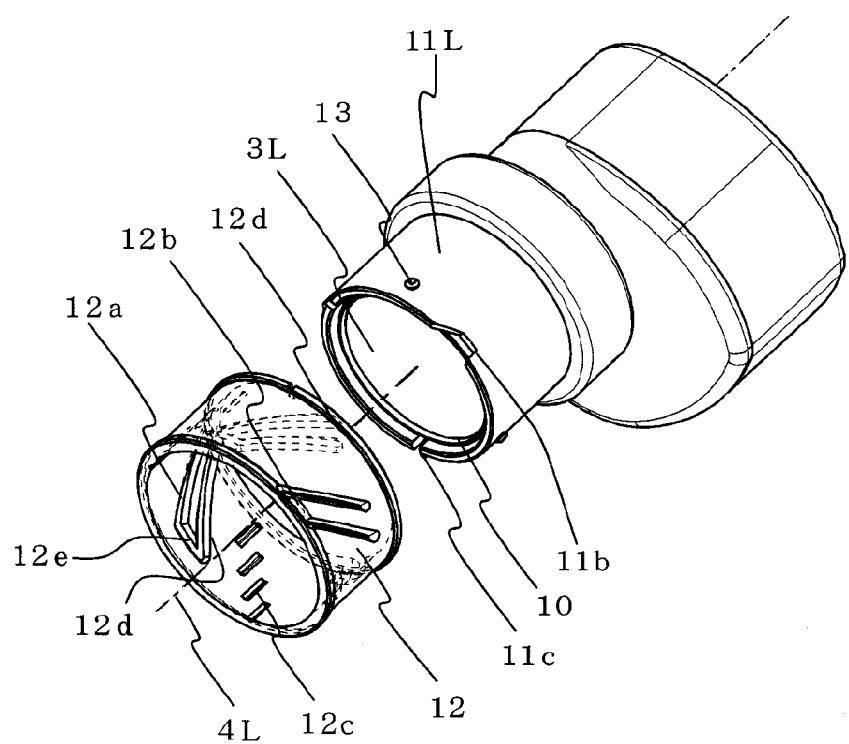
FIG. 3 is a partially exploded perspective view of the binoculars of Embodiment 1.
Figure 9:
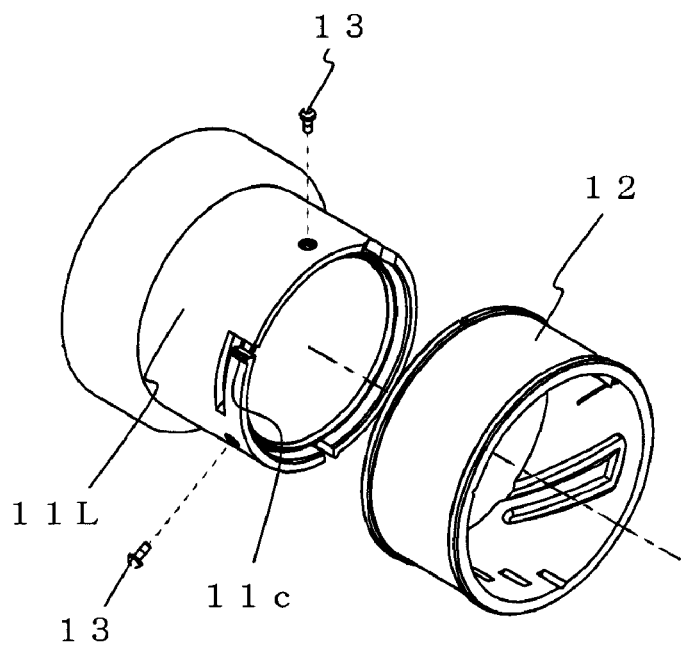
FIG. 9 is a partially exploded perspective view of the binoculars of Embodiment 1.

FIGS. 3 and 9 are exploded views of the eyepiece cup 12 and the ocular fixing frame 11L. In these figures, the eyepiece rubber 9 is omitted.

Figure 4:
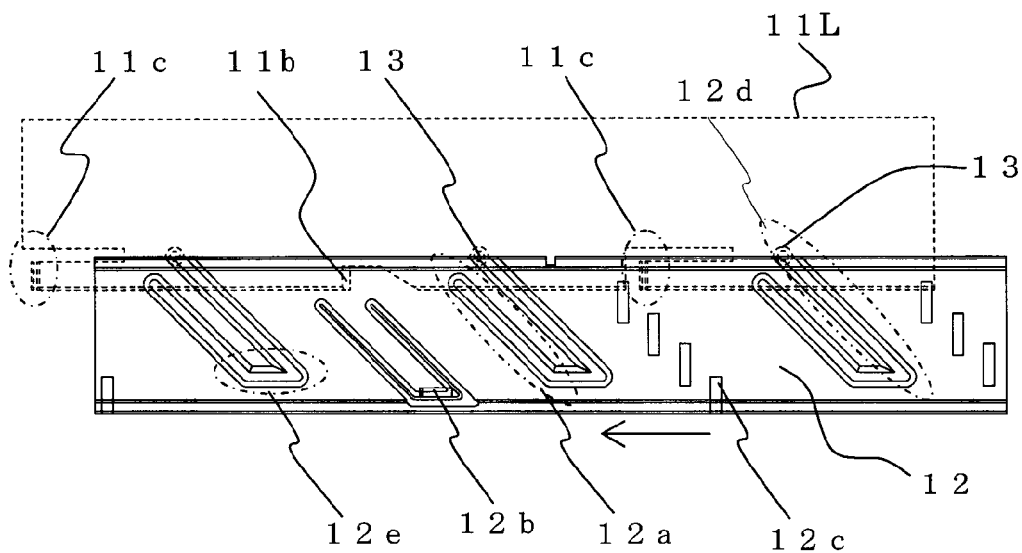
FIG. 4 is a development view of an eyepiece cup and an ocular fixing frame in Embodiment 1 at the beginning of assembly of the eyepiece cup to the ocular fixing frame.
Figure 5:
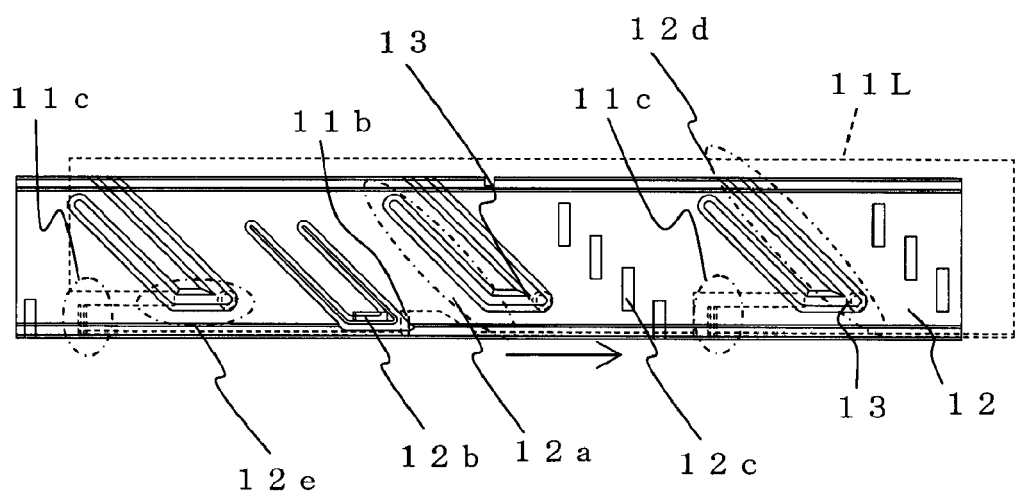
FIG. 5 is a development view of the eyepiece cup and the ocular fixing frame in Embodiment 1 in the middle of assembly of the eyepiece cup to the ocular fixing frame.
Figure 6:
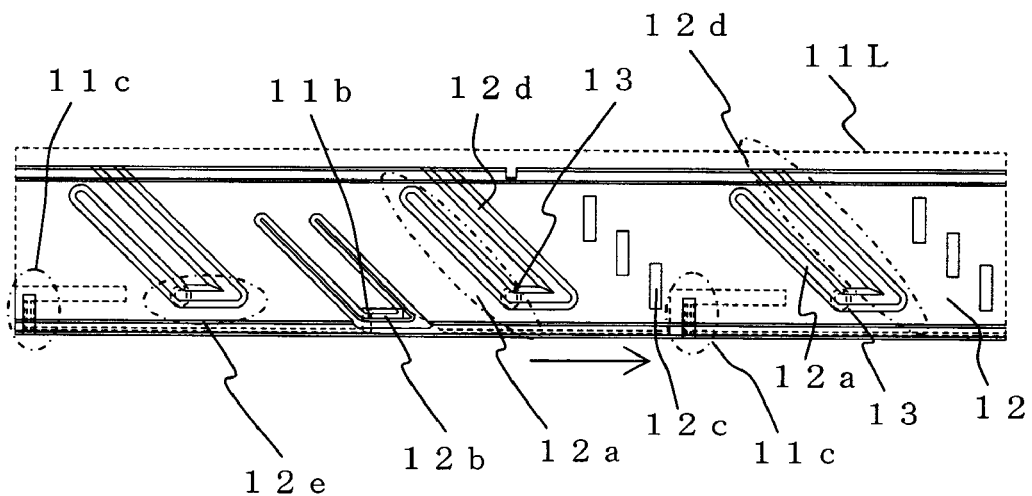
FIG. 6 is a development view of the eyepiece cup and the ocular fixing frame in Embodiment 1 after the assembly of the eyepiece cup to the ocular fixing frame has been finished.

FIGS. 4, 5 and 6 show the ocular fixing frame 11L (shown by dotted lines) and the eyepiece cup 12 (shown by solid lines) which are circumferentially developed and viewed from their inner circumferential surface side. FIG. 4 shows a configuration at the beginning of assembly of the eyepiece cup 12 to the ocular fixing frame 11L, FIG. 5 shows a configuration in the middle of the assembly of the eyepiece cup 12, and FIG. 6 shows a configuration at the end of the assembly of the eyepiece cup 12, respectively.

Figure 7:
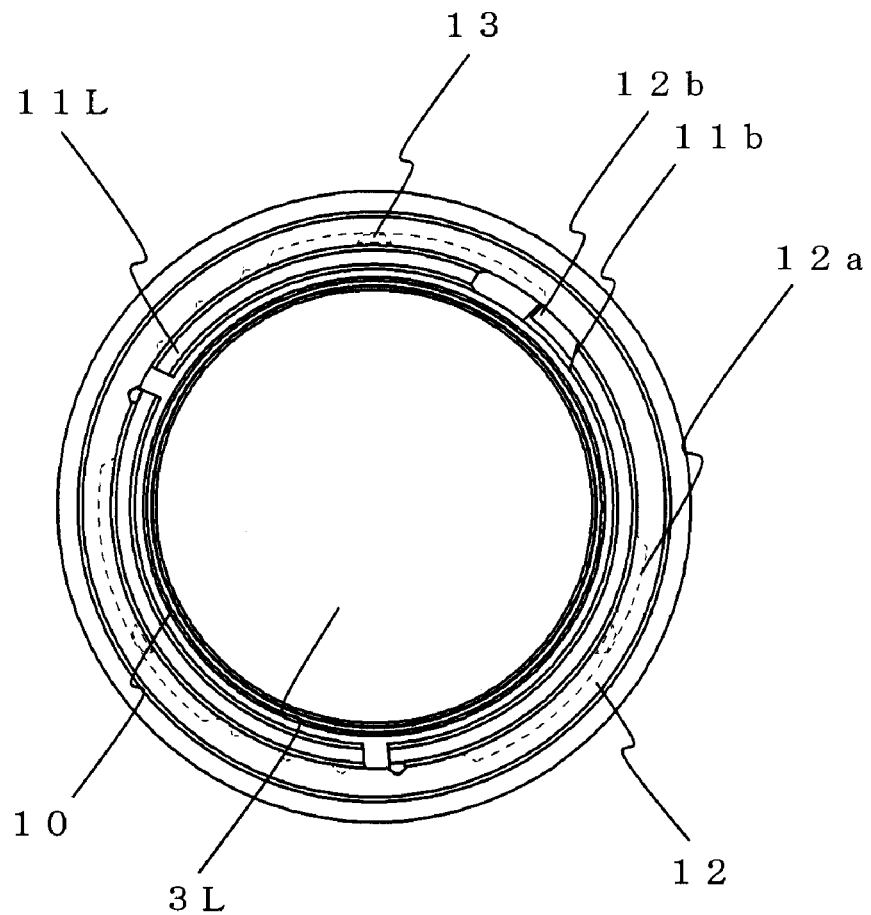
FIG. 7 is a rear view of the eyepiece cup, the ocular fixing frame and an ocular lens barrel in Embodiment 1 at a time of engagement of a stopper.
Figure 8:
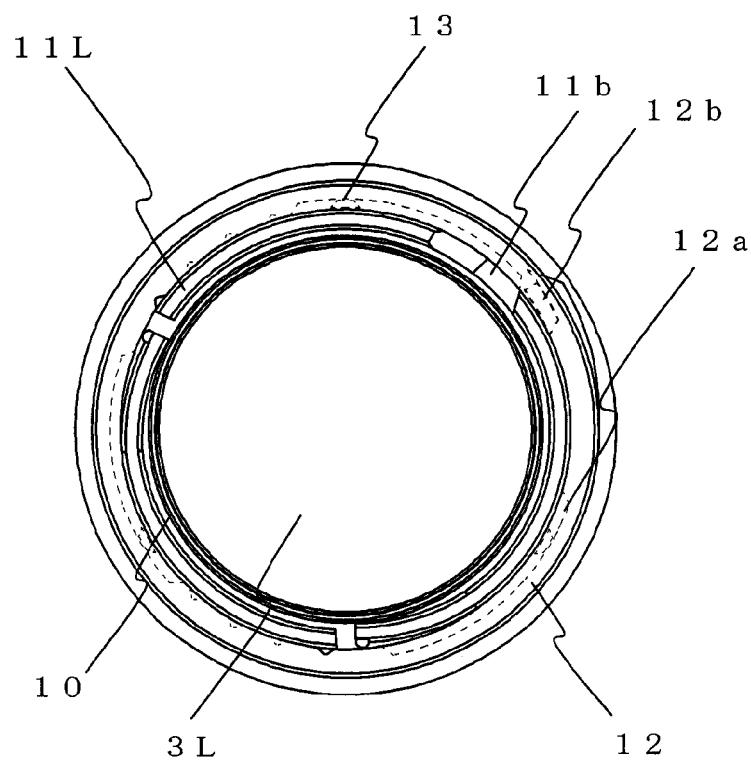
FIG. 8 is a rear view of the eyepiece cup, the ocular fixing frame and the ocular cylinder in Embodiment 1 in a stare where the stopper is retreated.

FIGS. 7 and 8 show the ocular lens barrel 10, the ocular fixing frame 11L and the eyepiece cup 12 viewed from the observer side.

As shown in FIGS. 2 to 9, on an inner circumferential surface of the eyepiece cup 12, cam groove portions 12a and introducing groove portions 12d are formed at plural circumferential positions. The introducing groove portion 12d adjacent to the cam groove portion 12a is provided for introducing a cam follower portion described later into the cam groove portion 12a. The introducing groove portion 12d opens at an object side opening portion of the eyepiece cup 12. The "object side" is an opposite side to the observer side.

Observer side ends of the cam groove portion 12a and the introduction groove portion 12d adjacent to each other are connected through a connecting groove portion 12e extending in a circumferential direction of the eyepiece cup 12.

Moreover, at a position different from those of the cam groove portions 12a on a circumferential wall of the eyepiece cup 12, a stopper 12b is provided which is formed integrally with the eyepiece cup 12 and elastically movable (deformable) in a radial direction of the circumferential wall of the eyepiece cup 12.

On the other hand, on an outer circumferential surface of the ocular fixing frame 11L, cam follower portions (protrusions) 13 are formed which are engageable with the cam groove portions 12a of the eyepiece cup 12. With rotation of the eyepiece cup 12 with respect to the ocular fixing frame 11L, the engagement of the cam follower portions 13 and the cam groove portions 12a moves the eyepiece cup 12 in the optical axis direction with respect to the ocular fixing frame 11L.

As shown in FIG. 9, the cam follower portions 13 are formed as metal members separate from the ocular fixing frame 11L, and attached to the ocular fixing frame 11L by bonding or press fitting thereto. However, the cam follower portions 13 may be formed integrally with the ocular fixing frame 11L.

FIGS. 4 and 5 show movement of the cam follower portion 13 with respect to the introducing groove portion 12d at a time of assembly of the eyepiece cup 12 to the ocular fixing frame 11L.

The introducing groove portion 12d is formed so as to cause the cam follower portion 13 to proceed therein toward the connecting groove portion 12e (that is, toward the cam groove portion 12a) with rotation of the eyepiece cup 12 in a first rotational direction shown by an arrow in FIG. 4. Thereby, the eyepiece cup 12 is moved (retracted) with respect to the ocular fixing frame 11L toward the object side that is an upper side in the figure.

As shown in FIG. 5, in a state where the cam follower portion 13 reaches a connecting groove portion side end of the introducing groove portion 12d, rotation of the eyepiece cup 12 in a second rotational direction which is shown by an arrow in FIG. 5 and opposite to the first rotational direction causes the cam follower portion 13 to proceed in the connecting groove portion 12e toward the cam groove portion 12a. The connecting groove portion side end of the introducing groove portion 12d corresponds to a boundary of the introducing groove portion 12d and the connecting groove portion 12e.

FIG. 6 shows a state where the cam follower portion 13 has reached a connecting groove portion side end (in other words, an introducing groove portion side end) of the cam groove portion 12a from the state shown in FIG. 5. The connecting groove portion side end of the cam groove portion 12a corresponds to a boundary of the cam groove portion 12a and the connecting groove portion 12e.

From this state, the rotation of the eyepiece cup 12 in the second direction causes the cam follower portion 13 to proceed in the cam groove portion 12a toward an end thereof opposite to the connecting groove portion side end. Thereby, the eyepiece cup 12 is moved (protruded) with respect to the ocular fixing frame 11L toward the observer side that is a lower side in the figure.

In a state where the cam follower portion 13 is located at the end opposite to the connecting groove portion side end in cam groove portion 12a, the rotation of the eyepiece cup 12 in the first rotational direction causes the cam follower portion 13 to proceed in the cam groove portion 12a toward the connecting groove portion side end thereof. Thereby, the eyepiece cup 12 is moved (retracted) with respect to the ocular fixing frame 11L toward the object side.

The above-described shapes of the introducing groove portion 12d and the cam groove portion 12a are merely examples, and therefore other shapes thereof may be employed.

At an observer side end of the ocular fixing frame 11L, an engaging portion 11b with which the stopper 12b of the eyepiece cup 12 is engageable in the circumferential direction is formed. In a state where the cam follower portion 13 is located in the introducing groove portion 12d and the connecting groove portion 12e, the stopper 12b is pushed outward in the radial direction of the eyepiece cup 12 by the outer circumferential surface of the ocular fixing frame 11L. Thereby, the stopper 12b is retreated from an engaging position engageable with the engaging portion 11b in a direction where the stopper 12b is elastically movable (that is, in the radial direction of the eyepiece cup 12). This state viewed from the observer side is shown in FIG. 8.

As shown in FIG. 6, the stopper 12b enters the engaging portion 11b of the ocular fixing frame 11L when the cam follower portion 13 is located in a connecting groove portion side end area (introducing groove portion side end area) of the cam groove portion 12a. That is, in the direction where the stopper 12b is elastically movable, the stopper 12b is moved to be located at the engaging position engageable with the engaging portion 11b. This state viewed from the observer side is shown in FIG. 7. The stopper 12b engages with the engaging portion 11b to prevent rotation of the eyepiece cup 12 in a direction in which the cam follower portion 13 is returned from the cam groove portion 12a to the connecting groove portion 12e.

The "connecting groove portion side end area (introducing groove portion side end area) of the cam groove portion 12a" includes not only the connecting groove portion side end (boundary of the cam groove portion 12a and the connecting groove portion 12e) of the cam groove portion 12a, but also an area in the vicinity thereof.

For example, a configuration may be employed in which the stopper 12b is moved to the engaging position engageable with the engaging portion 11b (that is, the stopper 12b engages with the engaging portion 11b) after the cam follower portion 13 proceeds a little further to the object side than the connecting groove portion side end of the cam groove portion 12a. Such a configuration reduces mistakes of the rotational direction of the eyepiece cup 12 in assembly thereof since the stopper 12b engages with the engaging portion 11b after the eyepiece cup 12 is protruded a little with respect to the ocular fixing frame 11L to the observer side.

Thus, this embodiment enables easy assembly of the eyepiece cup 12 to the ocular fixing frame 11L only by rotating the eyepiece cup 12 in a same rotational direction from a state where the cam follower portion 13 is introduced into the connecting groove portion 12e.

Rotating the eyepiece cup 12 in the second rotational direction from the state shown in FIG. 6 can cause the eyepiece cup 12 to move (protrude) to the observer side while holding the stopper 12b at the engaging position.

As shown in FIGS. 3 to 6, on the inner circumferential surface of the eyepiece cup 12 corresponding to "one member", plural clicking concave portions 12c whose positions in the circumferential direction are different from each other are formed. On the other hand, as shown in FIGS. 3 and 9, on the outer circumferential surface of the ocular fixing frame 11L corresponding to "another member", a clicking convex portion 11c is provided which is formed integrally with the ocular fixing frame 11L and elastically movable in a radial direction of the ocular fixing frame 11L.

A rotational operation of the eyepiece cup 12 with respect to the ocular fixing frame 11L in the state where the cam follower portion 13 is located in the cam groove portion 12a causes the clicking convex portion 11c of the ocular fixing frame 11L to engage with and disengage from the respective clicking concave portions 12c at plural rotational positions of the eyepiece cup 12. The engagement of the clicking convex portion 11c with each of the clicking concave portions 12c provides click feeling to the rotational operation of the eyepiece cup 12, and can stop the rotation of the eyepiece cup 12 at the plural rotational positions (in other words, plural positions in the optical axis direction).

The clicking convex portion 11c is not necessarily needed to be elastically movable. A configuration may be employed in which a clicking convex portion is provided to the inner circumferential surface of the eyepiece cup 12 and clicking concave portions are provided on the outer circumferential surface of the ocular fixing frame 11L.

As described above, this embodiment includes the elastically movable stopper 12b formed on the eyepiece cup 12, and the stopper 12b engages with the engaging portion 11b of the ocular fixing frame 11L in the state where the cam follower portion 13 is located in the connecting groove portion side end area of the cam groove portion 12a. This prevents the rotation of the eyepiece cup 12 in the direction in which the cam follower portion 13 is returned to the connecting groove portion side.

Such a configuration of the eyepiece cup 12 reduces the number of exclusive parts provided for limiting a rotational angle of the eyepiece cup and for preventing returning of the cam follower portion to the connecting groove portion, as compared with conventional rotating protrudable eyepiece cups. Therefore, the number of assembling steps of the binoculars is also reduced.

Moreover, this embodiment can reduce the size of the eyepiece cup 12 in its radial direction since respectively forming the stopper 12b and the engaging portion 11b integrally with the eyepiece cup 12 and the ocular fixing frame 11L. Thereby, this embodiment can realize low-cost and compact binoculars.

In addition, this embodiment uses the cam follower portion 13 formed of a metal material and attached to the ocular fixing frame 11L to improve slidability of the eyepiece cup 12 with which the cam follower portion 13 engages and to reduce backlash of the engagement thereof. However, the material of the cam follower portion is not limited thereto. Moreover, forming the cam follower portion integrally with the ocular fixing frame 11L can also realize low-cost and compact binoculars.

[Embodiment 2]

Figure 10:
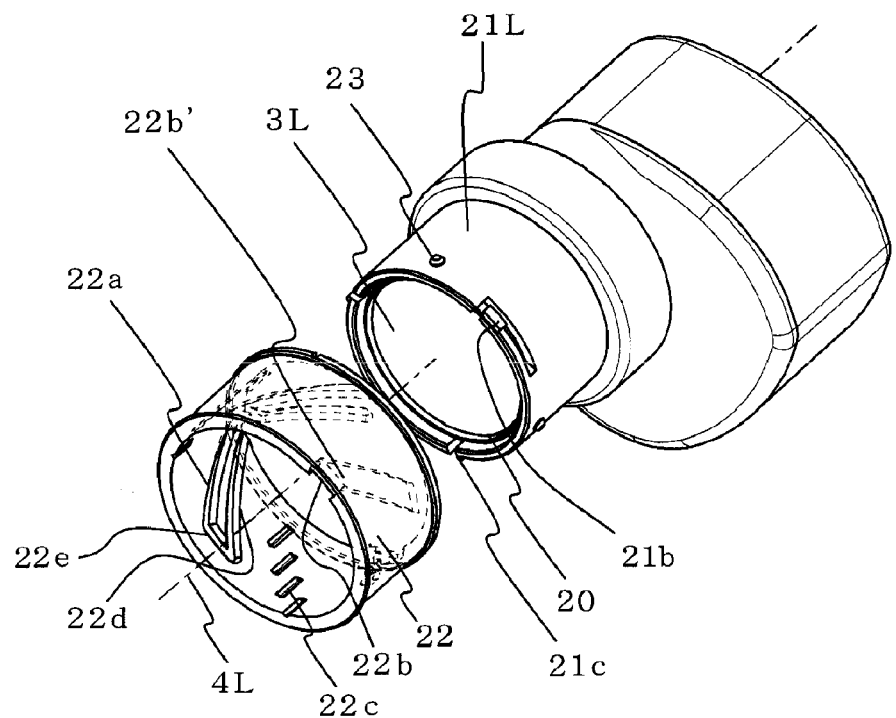
FIG. 10 is a partially exploded perspective view of binoculars of Embodiment 2 of the present invention.

FIG. 10 is an exploded view of an eyepiece cup and an ocular fixing frame included in an ocular unit for binoculars of a second embodiment (Embodiment 2) of the present invention. Although the binoculars of this embodiment basically have a similar configuration to that of the binoculars of Embodiment 1, the configuration of this embodiment is different from that of Embodiment 1 in that a stopper is provided on the ocular fixing frame and an engaging portion with which the stopper is engageable is provided on the eyepiece cup.

In this embodiment, each portion having a function common to that of Embodiment 1 is denoted by the same name as that in Embodiment 1, and each element coincident to that in Embodiment 1 is denoted by the same reference numeral as that in Embodiment 1.

In FIG. 10, on an inner circumferential surface of the eyepiece cup 22 disposed at an outer circumference of the ocular fixing frame 21L holding an ocular lens barrel 20, cam groove portions 22a, introducing groove portions 22d and connecting groove portions 22e are formed. Moreover, at a circumferential position different from those of the cam groove portions 22a on the inner circumferential surface of the eyepiece cup 22, the engaging portion 22b is formed.

Furthermore, on an outer circumferential surface of the ocular fixing frame 21L, cam follower portions 23 engaging with the cam groove portions 22a of the eyepiece cup 22 are formed.

The stopper 21b elastically movable in a radial direction of the ocular fixing frame 21L is formed integrally with the ocular fixing frame 21L.

In a state where each cam follower portion (protrusion) 23 is located in each introducing groove portion 22d and each connecting groove portion 22e, the stopper 21b is pushed inward in the radial direction of the ocular fixing frame 21L by the inner circumferential surface of the eyepiece cup 22. The stopper 21b is thereby retreated from an engaging position engageable with the engaging portion 22b in an elastically movable direction of the stopper 21b (the radial direction of the ocular fixing frame 21L).

When each cam follower portion 23 is located in a connecting groove portion side end area of each cam groove portion 22a, the stopper 21b is moved to the engaging position engageable with the engaging portion 22b. Thereby, the stopper 21b engages with the engaging portion 22b to prevent rotation of the eyepiece cup 22 in a direction in which the cam follower portion 23 is returned from the cam groove portion 22a to the connecting groove portion 22e.

When the cam follower portion 23 is moved in the cam groove portion 22a, the stopper 21b that has moved to the engaging position proceeds in a recess groove portion 22b' formed on the inner circumferential surface of the eyepiece cup 22 so as to extend from the engaging portion 22b and have the same shape as that of the cam groove portion 22a.

In this embodiment, the ocular fixing frame 21L corresponds to a "first member", and further corresponds to "another member" of the first member and a second member. The eyepiece cup 22 corresponds to the "second member", and further corresponds to "one member" of the first and second members.

Additionally, a clicking convex portion 21c elastically movable in the radial direction of the ocular fixing frame 21L is formed integrally with the ocular fixing frame 21L. Moreover, on the inner circumferential surface of the eyepiece cup 22, plural clicking concave portions 22c are formed. The clicking convex portion 21c is engageable with and disengageable from the respective clicking concave portions 22c at plural rotational positions of the eyepiece cup 22.

The clicking convex portion 21c and the clicking concave portions 22c have the same functions as those of the clicking convex portion 11c and the clicking concave portions 12c described in Embodiment 1.

This embodiment provides effects similar to those of Embodiment 1.

[Embodiment 3]

Figure 11:
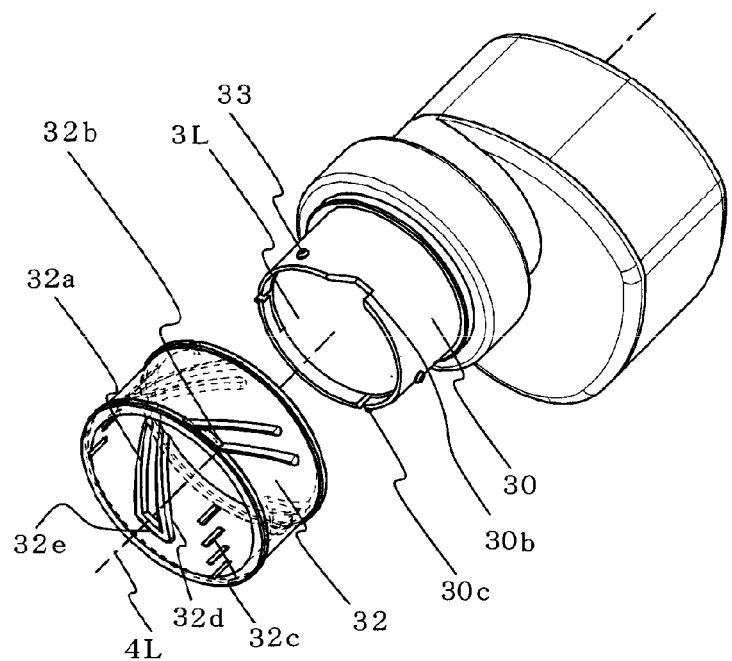
FIG. 11 is a partially exploded perspective view of binoculars of Embodiment 3 of the present invention.

FIG. 11 is an exploded view of an eyepiece cup and an ocular lens barrel included in an ocular unit for binoculars of a third embodiment (Embodiment 3) of the present invention. Although the binoculars of this embodiment basically have a similar configuration to that of the binoculars of Embodiment 1 and the eyepiece cup has a configuration common to that of the eyepiece cup in Embodiment 1, the configuration of this embodiment is different from that of Embodiment 1 in that cam follower portions and an engaging portion are provided on the ocular lens barrel (supporting member). This embodiment does not include the ocular fixing frame 11L described in Embodiment 1.

In this embodiment, each portion having a function common to that of Embodiment 1 is denoted by the same name as that in Embodiment 1, and each element coincident to that in Embodiment 1 is denoted by the same reference numeral as that in Embodiment 1.

In FIG. 11, on an inner circumferential surface of the eyepiece cup 32 disposed at an outer circumference of the ocular lens barrel 30, cam groove portions 32a, introducing groove portions 32d and connecting groove portions 32e are formed. Moreover, at a circumferential position different from those of the cam groove portions 32a on the inner circumferential surface of the eyepiece cup 32, a stopper elastically movable in a radial direction of the eyepiece cup 32 is formed integrally with the eyepiece cup 32.

Moreover, on an outer circumferential surface of the ocular lens barrel 30, the cam follower portions 33 engaging with the cam groove portions 32a of the eyepiece cup 32 are formed. On the ocular lens barrel 30, the engaging portion 30b is formed with which the stopper 32b is engageable.

In a state where each cam follower portion 33 is located in each introducing groove portion 32d and each connecting groove portion 32e, the stopper 32b is pushed outward in the radial direction of the eyepiece cup 32 by the outer circumferential surface of the ocular lens barrel 30. The stopper 32b is thereby retreated from an engaging position engageable with the engaging portion 30b in an elastically movable direction of the stopper 32b (the radial direction of the eyepiece cup 32).

When each cam follower portion 33 is located in a connecting groove portion side end area of each cam groove portion 32a, the stopper 32b is moved to the engaging position engageable with the engaging portion 30b. Thereby, the stopper 32b engages with the engaging portion 30b to prevent rotation of the eyepiece cup 32 in a direction in which the cam follower portion 33 is returned from the cam groove portion 32a to the connecting groove portion 32e.

In this embodiment, the ocular lens barrel 30 corresponds to a "first member", and further corresponds to "one member" of the first member and a second member. Moreover, the eyepiece cup 32 corresponds to the "second member", and further corresponds to "another member" of the first and second members.

Additionally, a clicking convex portion 30c elastically movable in the radial direction of the ocular lens barrel 30 is formed integrally with the ocular lens barrel 30. Moreover, on the inner circumferential surface of the eyepiece cup 32, plural clicking concave portions 32c are formed. The clicking convex portion 30c is engageable with and disengageable from the respective clicking concave portions 32c at plural rotational positions of the eyepiece cup 32. The clicking convex portion 30c and the clicking concave portions 32c have the same functions as those of the clicking convex portion 11c and the clicking concave portions 12c described in Embodiment 1.

This embodiment provides effects similar to those of Embodiment 1.

[Embodiment 4]

Figure 12:
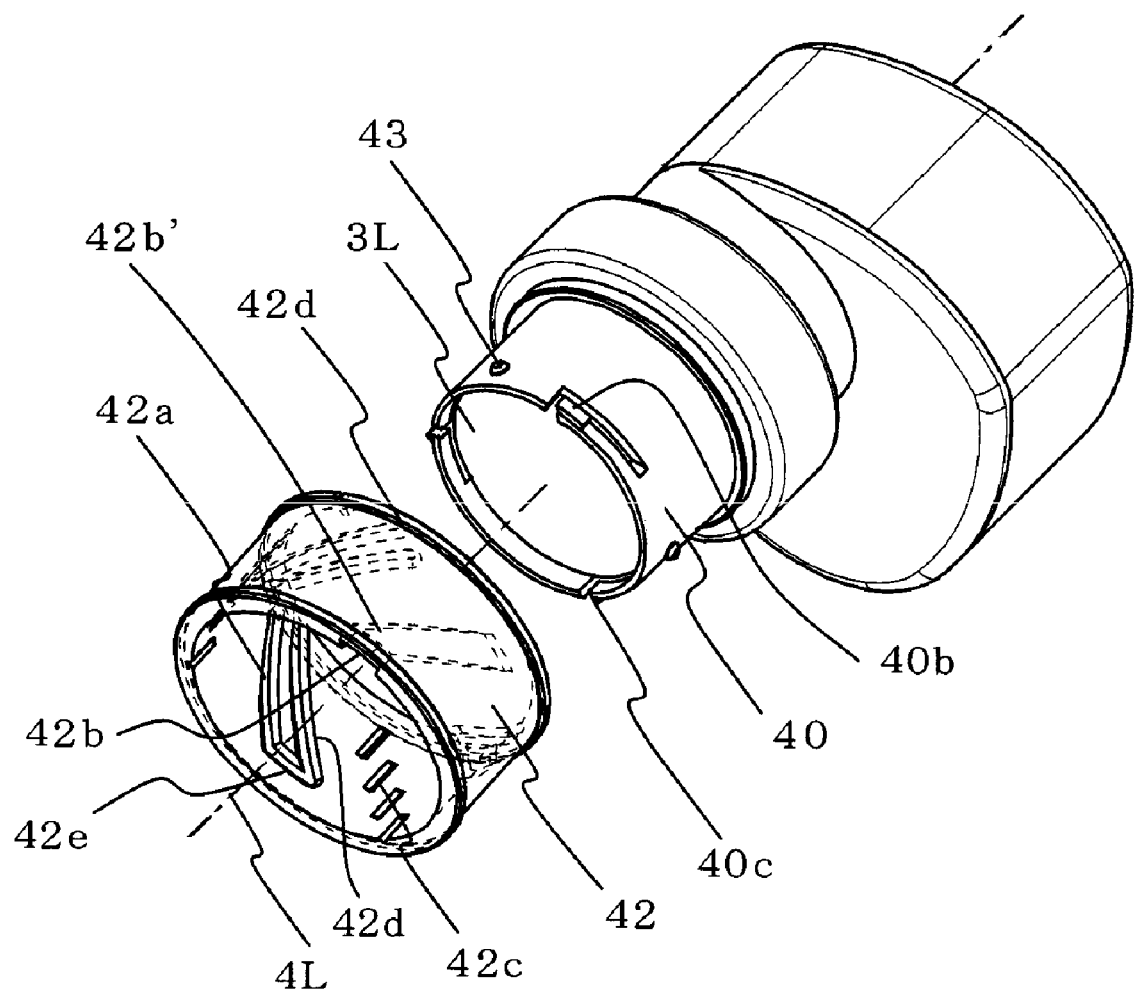
FIG. 12 is a partially exploded perspective view of binoculars of Embodiment 4 of the present invention.

FIG. 12 is an exploded view of an eyepiece cup and an ocular lens barrel included in an ocular unit for binoculars of a fourth embodiment (Embodiment 4) of the present invention. Although the binoculars of this embodiment basically have a similar configuration to that of the binoculars of Embodiment 1 and the eyepiece cup has a configuration common to that of the eyepiece cup in Embodiment 2, the configuration of this embodiment is different from that of Embodiment 2 in that cam follower portions and a stopper are provided on the ocular lens barrel (supporting member). This embodiment does not include the ocular fixing frame 11L described in Embodiment 1. In this embodiment, each portion having a function common to that of Embodiments 1 and 2 is denoted by the same name as that in these embodiments, and each element coincident to that in Embodiments 1 and 2 is denoted by the same reference numeral as that in these embodiments.

In FIG. 12, on an inner circumferential surface of the eyepiece cup 42 disposed at an outer circumference of the ocular lens barrel 40, cam groove portions 42a, introducing groove portions 42d and connecting groove portions 42e are formed. The connecting groove portion 42e is part of the introducing groove portion 42d. Moreover, at a circumferential position different from those of the cam groove portions 42a on the inner circumferential surface of the eyepiece cup 42, an engaging portion 42b is formed.

Moreover, on an outer circumferential surface of the ocular lens barrel 40, the cam follower portions 43 engaging with the cam groove portions 42a of the eyepiece cup 42 are formed.

The stopper 40b elastically movable in a radial direction of the ocular lens barrel 40 is formed integrally with the ocular lens barrel 40.

In a state where each cam follower portion 43 is located in each introducing groove portion 42d and each connecting groove portion 42e, the stopper 40b is pushed inward in the radial direction of the ocular lens barrel 40 by the inner circumferential surface of the eyepiece cup 42. The stopper 40b is thereby retreated from an engaging position engageable with the engaging portion 42b in an elastically movable direction of the stopper 40b (that is, in the radial direction of the ocular lens barrel 40).

When each cam follower portion 43 is located in a connecting groove portion side end area of each cam groove portion 42a, the stopper 40b is moved to the engaging position engageable with the engaging portion 42b. Thereby, the stopper 40b engages with the engaging portion 42b to prevent rotation of the eyepiece cup 42 in a direction in which the cam follower portion 43 is returned from the cam groove portion 42a to the connecting groove portion 42e.

When the cam follower portion 43 is moved in the cam groove portion 42a, the stopper 40b that has moved to the engaging position proceeds in a recess groove portion 42b' formed on the inner circumferential surface of the eyepiece cup 42 so as to extend from the engaging portion 42b and have the same shape as that of the cam groove portion 42a.

In this embodiment, the ocular lens barrel 40 corresponds to a "first member", and further corresponds to "another member" of the first member and a second member. The eyepiece cup 42 corresponds to the "second member", and further corresponds to "one member" of the first and second members.

Additionally, a clicking convex portion 40c elastically movable in the radial direction of the ocular lens barrel 40 is formed integrally with the ocular lens barrel 40. Moreover, on the inner circumferential surface of the eyepiece cup 42, plural clicking concave portions 40c are formed. The clicking convex portion 40c is engageable with and disengageable from the respective clicking concave portions 42c at plural rotational positions of the eyepiece cup 42. The clicking convex portion 40c and the clicking concave portions 42c have the same functions as those of the clicking convex portion 11c and the clicking concave portions 12c described in Embodiment 1.

This embodiment provides effects similar to those of Embodiment 1.

As described above, each of Embodiments 1 to 4 has a configuration in which the stopper formed integrally with one member of the first and second members so as to be elastically movable prevents drop-off of the eyepiece cup from the supporting member. Thus, each of Embodiments 1 to 4 enables prevention of the drop-off of the eyepiece cup with a simpler configuration than those of conventional rotating protrudable eyepiece cups, and enables reduction of the number of parts and the number of assembling steps. Moreover, each of Embodiments 1 to 4 enables reduction of the size of the eyepiece cup in its radial direction.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, each of embodiments 1 to 4 described the case where the cam groove portion and the introducing groove portion are formed on the eyepiece cup, and the cam follower portion is formed on the ocular fixing frame or ocular lens barrel, which is the supporting member. However, the cam groove portion and the introducing groove portion may be formed on the supporting member (second member), and the cam follower portion may be formed on the eyepiece cup.

Moreover, although each of embodiments 1 to 4 described the binoculars, alternative embodiments of the present invention include other optical observation apparatuses such as a telescope and a monocular.

This application claims the benefit of Japanese Patent Application No. 2008-315682, filed on Dec. 11, 2008, which is hereby incorporated by reference herein in its entirety.

What is claimed is:

1. An optical observation apparatus comprising:
   an ocular optical system;
   a supporting member disposed at an outer circumference of the ocular optical system; and
   an eyepiece cup disposed at an outer circumference of the supporting member, the eyepiece cup being rotatable around an optical axis of the ocular optical system and movable in a direction of the optical axis with respect to the supporting member,
   wherein, when one of the supporting member and the eyepiece cup is referred to as a first member and another thereof is referred to as a second member, the first member includes a cam follower portion, and the second member includes (a) a cam groove portion engaging with the cam follower portion to move the eyepiece cup in the direction of the optical axis with rotation of the eyepiece cup and (b) an introducing groove portion through which the cam follower portion is introduced to the cam groove portion with rotation of the eyepiece cup when the eyepiece cup is assembled to the supporting member,
   wherein one member of the first and second members includes an engaging portion, and another member thereof includes a stopper engaging with the engaging portion to prevent rotation of the eyepiece cup in a direction in which the cam follower portion is returned from the cam groove portion toward the introducing groove portion,
   wherein the stopper is formed integrally with another member and elastically movable so as to be retreated from an engaging position engageable with the engaging portion in a state where the cam follower portion is located in the introducing groove portion and so as to be located at the engaging position in a state where the cam follower portion is located at an introducing groove portion side end area of the cam groove portion.

2. An optical observation apparatus according to claim 1, wherein one of the supporting member and the eyepiece cup includes a convex portion, and another thereof includes plural concave portions, the convex portion engages with and disengages from each of the concave portions according to rotation of the eyepiece cup.

3. An optical observation apparatus according to claim 1, wherein the introducing groove portion is formed so as to cause the cam follower portion to proceed therein toward the cam groove portion with rotation of the eyepiece cup in a first rotational direction, and the cam groove portion is formed so as to cause the cam follower portion to proceed therein toward an end of the cam groove portion opposite to the introducing groove portion with rotation of the eyepiece cup in a second rotational direction opposite to the first rotational direction.

* * * * *